(12) United States Patent
Kim et al.

(10) Patent No.: US 9,115,278 B2
(45) Date of Patent: Aug. 25, 2015

(54) POLYOLEFIN-BASED RESIN COMPOSITION

(71) Applicants: Hyundai Motor Company, Seoul (KR); Lotte Chemical Corporation, Seoul (KR)

(72) Inventors: Hak-Soo Kim, Seoul (KR); Kyeong-Hoon Jang, Seoul (KR); Dae-Sik Kim, Gyeonggi-do (KR); Jung-Gyun Noh, Gyeonggi-do (KR); Han-Ki Lee, Gyeonggi-do (KR); Sung-Min Cho, Daejun (KR); Kyung-Hoon Kim, Daejun (KR); Byung-Kook Nam, Daejun (KR)

(73) Assignees: Hyundai Motor Company, Seoul (KR); Lotte Chemical Corporation, Seoul (KR)

( * ) Notice: Subject to any disclaimer, the term of this patent is extended or adjusted under 35 U.S.C. 154(b) by 0 days.

(21) Appl. No.: 13/923,887

(22) Filed: Jun. 21, 2013

(65) Prior Publication Data
US 2014/0206806 A1    Jul. 24, 2014

(30) Foreign Application Priority Data

Jan. 23, 2013    (KR) ........................ 10-2013-0007692

(51) Int. Cl.
*C08K 5/00*    (2006.01)
*C08L 23/12*    (2006.01)

(52) U.S. Cl.
CPC ........... *C08L 23/12* (2013.01); *C08L 2205/025* (2013.01); *C08L 2205/03* (2013.01)

(58) Field of Classification Search
USPC ......................................................... 524/284
See application file for complete search history.

(56) References Cited

FOREIGN PATENT DOCUMENTS

| JP | 2004217896 A | | 8/2004 | |
| JP | 2007537352 A | | 12/2007 | |
| KR | 20120028537 | * | 3/2012 | ............... C08K 3/00 |
| KR | 10-2012-0057434 A | | 6/2012 | |

* cited by examiner

*Primary Examiner* — Ling Choi
*Assistant Examiner* — Thuy-Ai Nguyen
(74) *Attorney, Agent, or Firm* — Mintz Levin Cohn Ferris Glovsky and Popeo, P.C.; Peter F. Corless

(57) ABSTRACT

Disclosed are a polyolefin-based resin composition having excellent scratch resistance and low glossiness, a preparation method thereof, and automobile interior and exterior materials fabricated therefrom. The polyolefin-based resin composition comprises about 56 to 97% by weight of a polypropylene block copolymer resin, about 1 to 9% by weight of a thermoplastic elastomer rubber, about 1 to 30% by weight of an inorganic filler, and about 1 to 5% by weight of a fluoroacrylamide-based copolymer based on a total weight of the composition.

10 Claims, 3 Drawing Sheets

POLYOLEFIN-BASED RESIN COMPOSITION

CROSS-REFERENCE TO RELATED APPLICATIONS

This application claims priority under 35 U.S.C. §119 to Korean Patent Application No. 10-2013-0007692, filed on Jan. 23, 2013, in the Korean Intellectual Property Office, the disclosure of which is incorporated herein by reference in its entirety.

BACKGROUND OF THE INVENTION

1. Field of the Invention

The present invention relates to a polyolefin-based resin composition, and more particularly, to a polyolefin-based resin composition having improved scratch resistance and excellent low glossiness by use of polypropylene block copolymer resins which have excellent low glossiness, crystallinity, surface hardness, and impact resistance.

2. Description of the Related Art

Polyolefin-based resin compositions have excellent moldability, impact resistance, chemical resistance and the like, and further provide low specific gravity and low cost. Thus, such compositions are widely used in interior and exterior materials of automobiles. In particular, materials used to fabricate, for example, a glove box, console and center crash pad of an automobile need to satisfy aesthetic effects for a driver as well as impact resistance. Thus, such materials must provide both scratch resistance and low glossiness.

Scratch marks are produced by the whitening phenomenon, and the whitening phenomenon occurs while light is scattered by crazing, cracking, debonding, microvoids and the like generated by a specific external force. Since the scratch marks generated by the whitening phenomenon degrade aesthetic effects of a product, an effort to improve the scratch resistance of the product has been continuously made in order to reduce or remove the scratch marks.

In an attempt to improve scratch resistance of polyolefin-based resin compositions, silicone-based compounds have been added to the compositions. Korean Patent Application Laid-Open No. 2005-0093186 describes a method of improving scratch resistance of polyolefin-based resin compositions by adding a silicon-based resin to the compositions. However, while scratch resistance of a product is improved, it is easy to transfer silicone to the surface of the composition during the molding of the product. This results in surface unevenness due to gas generation, and further results in excessive gloss on the surface of the composition and a deterioration of physical properties thereof.

Further, Korean Patent Application Laid-Open No. 2012-0028537 describes a method of improving scratch resistance of polyolefin-based resin compositions by adding a fluorine resin to the compositions. However, the price of the added fluorine resin is high, and physical properties of the compositions are easily change due to the molding conditions. Further, a feeling of exclusivity of the product is reduced by a significantly increased gloss of the surface of the composition.

As described above, since scratch resistance and low glossiness tend to be inversely proportional to each other, there is a problem in that when a scratch resistance improving agent is added or the content thereof is increased in order to improve scratch resistance of the composition, the gloss on the surface of the composition is increased. As a result, a feeling of exclusivity of the product deteriorates due to the increase in gloss on the surface of the composition. On the other hand, when the scratch resistance improving agent is not added or the content thereof is decreased in order to reduce the gloss thereof, scratch resistance is reduced.

SUMMARY OF THE INVENTION

The present invention provides a polyolefin-based resin composition having excellent scratch resistance and low glossiness.

According to one aspect, the present invention provides a polyolefin-based resin composition comprising a polypropylene block copolymer, a thermoplastic elastomer rubber, an inorganic filler, and a fluoroacrylamide-based copolymer.

According to various embodiments of the present invention, a polyolefin-based resin composition includes about 25 to 97% by weight of a polypropylene block copolymer resin, about 1 to 40% by weight of a thermoplastic elastomer rubber, about 1 to 30% by weight of an inorganic filler, and about 1 to 5% by weight of a fluoroacrylamide-based copolymer, based on a total weight of the composition.

According to various embodiments, the polypropylene block copolymer resin includes about 80 to 95% by weight (based on total weight of the polypropylene block copolymer resin) of a homopolypropylene having an isotactic pentad fraction of about 99% or more, and about 5 to 20% by weight (based on total weight of the polypropylene block copolymer resin) of an ethylene-propylene copolymer including ethylene in an amount of about 70 to 90% by weight (based on total weight of the ethylene-propylene copolymer).

According to various embodiments, the polypropylene block copolymer resin has a melt index of about 8 to 150 g/10 min (230° C., 2.16 Kgf).

According to various embodiments, the thermoplastic elastomer rubber is a copolymer of ethylene and $C_2$ to $C_{10}$ α-olefin. According to various embodiments, the α-olefin includes one or more selected from the group consisting of propylene, butene, pentene, hexene, propene, and octene.

According to various embodiments, the thermoplastic elastomer rubber includes one or more selected from the group consisting of ethylene-propylene rubber (EPR), ethylene-propylene-diene rubber (EPDM), ethylene-butene copolymer (EBR), ethylene-octene copolymer (EOR), and styrene-butadiene (SBR).

According to an exemplary embodiment, the ethylene-butene copolymer (EBR) includes about 50% by weight or more of a butene comonomer based on a weight of the EBR, and has a melt index of about 0.5 to 150 g/10 min (190° C., 2.6 kgf) and a density of about 0.868 to 0.885 g/cc.

According to various embodiments, the inorganic filler includes one or more selected from the group consisting of talc, calcium carbonate, calcium sulfate, magnesium oxide, calcium stearate, wollastonite, mica, silica, calcium silicate, clay, and carbon black.

According to various embodiments, the inorganic filler has an average particle diameter of 1 to 30 μm.

According to various embodiments, the fluoroacrylamide-based copolymer has a number average molecular weight of about 50,000 to 100,000 g/mol.

According to another aspect, the present invention provides an automobile interior or exterior material fabricated from the polyolefin-based resin composition.

According to the present invention, excellent scratch resistance and low glossiness are provided to a material by including a polypropylene block copolymer resin having excellent crystallinity, surface hardness, and scratch resistance. As such, the present invention ensures high quality of automobile parts.

Further, the present invention does not require a separate additional process in order to improve scratch resistance and low glossiness, in contrast with conventional materials and processes. As a result, cost reduction and productivity is improved.

Other features and aspects of the present invention will be apparent from the following detailed description, drawings and claims.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
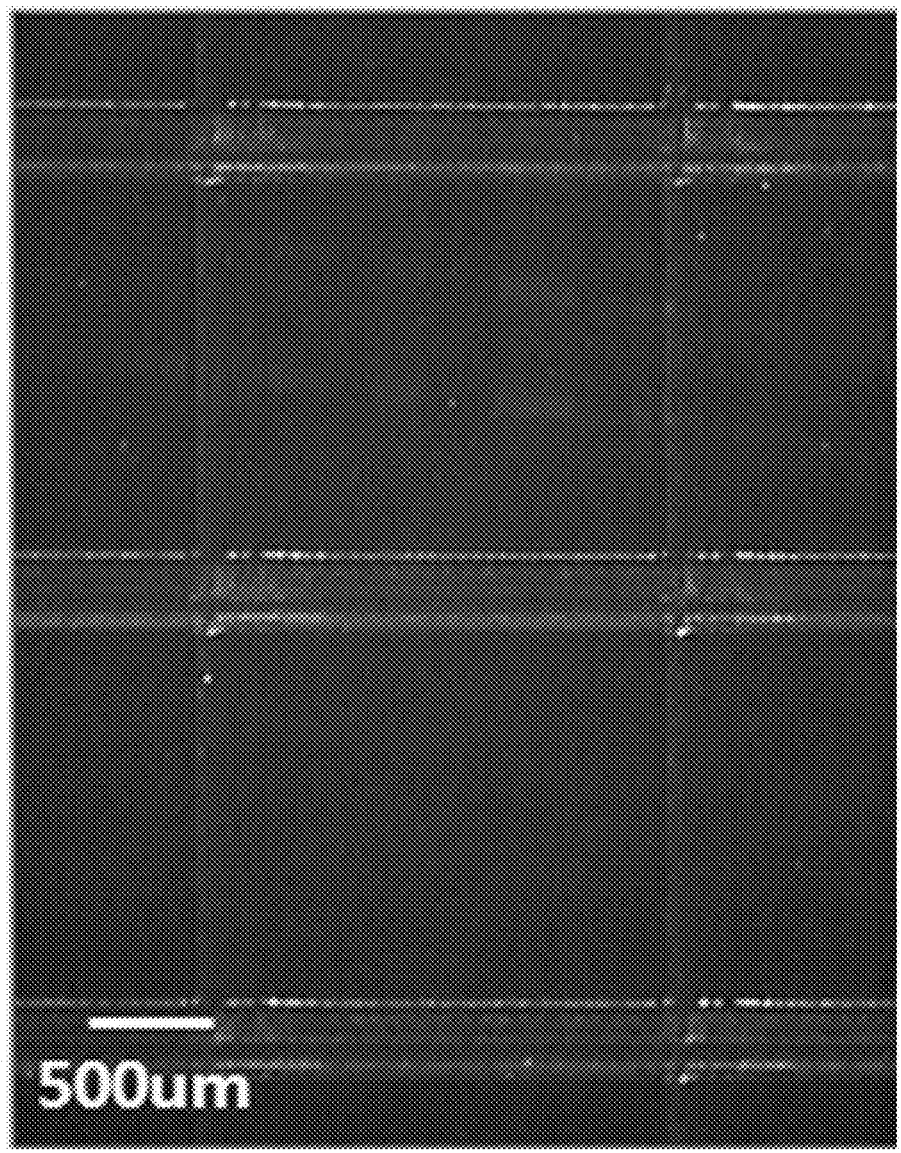
FIG. 1 is a photograph of a scratch resistance test result of Example 1.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter, the present invention will be described in more detail with reference to the accompanying tables and drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

According to the present invention, a polyolefin-based resin composition is provided which includes a combination of a polypropylene block copolymer resin, a thermoplastic elastomer rubber, an inorganic filler, and a fluoroacrylamide-based copolymer. In particular, it is preferred that the polyolefin-based resin composition comprises about 25 to 97% by weight of a polypropylene block copolymer resin, about 1 to 40% by weight of a thermoplastic elastomer rubber, about 1 to 30% by weight of an inorganic filler, and about 1 to 5% by weight of a fluoroacrylamide-based copolymer based on a total weight of the composition. Hereinafter, each constituent component will be specifically described.

1) Polypropylene Block Copolymer Resin

The polypropylene block copolymer resin is a base material for preparing a composition that may satisfy both scratch resistance and low glossiness. According to preferred embodiments, the polypropylene block copolymer resin is present in an amount of about 25 to 97% by weight based on the total weight of the composition. When the content of the polypropylene block copolymer resin is less than about 25% by weight, it is difficult to prepare a composition that may satisfy both scratch resistance and low glossiness. On the other hand, when the content is more than about 97% by weight, there is a problem in that the impact resistance of the composition may be reduced.

Further, it is preferred that the polypropylene block copolymer resin includes about 80 to 95% by weight of a homopolypropylene and about 5 to 20% by weight of an ethylene-propylene copolymer, based on total weight of the polypropylene block copolymer resin. Preferably, the homopolypropylene has an isotactic pentad fraction of about 99% or more. Preferably, the ethylene-propylene copolymer includes ethylene in an amount of about 70 to 90% by weight, based on total weight of the ethylene-propylene copolymer.

When the isotactic pentad fraction of the homopolypropylene is less than about 99%, there is a disadvantage in that the crystallinity and surface hardness of the polypropylene block copolymer resin are reduced, and thus the scratch resistance of the composition is reduced.

In addition, when the content of the homopolypropylene is less than about 80% by weight, the crystallinity and surface hardness of the polypropylene block copolymer resin are reduced. This results in reduced scratch resistance of the polyolefin-based resin composition. On the other hand, when the content of the homopolypropylene is more than about 95% by weight, the impact strength of the polypropylene block copolymer resin is reduced. This also results in reduced scratch resistance of the polyolefin-based resin composition.

Preferably, in the polypropylene block copolymer resin, the ethylene-propylene copolymer is composed of a non-crystalline ethylene-propylene copolymer and a semi-crystalline ethylene copolymer. When the polymerization ratio of the semi-crystalline ethylene copolymer is high, the semi-crystalline ethylene copolymer is present in a dispersed form having a size in a range from several to several tens of micrometers in a polypropylene matrix. This diffuses reflecting light incident on the composition and, thus, improves low glossiness of the polyolefin-based resin composition. Furthermore, since high crystallinity and high surface hardness characteristics may be imparted to the polypropylene block copolymer resin, there is an effect in that the scratch resistance of the polyolefin-based resin composition is improved.

In particular, ethylene is injected into a gas-phase reactor which polymerizes the ethylene-propylene copolymer. Preferably, the ethylene is present in an amount of about 70 to 90% by weight based on the weight of the copolymer. It is, thus, possible to prepare an ethylene-propylene copolymer having an efficient ratio of the semi-crystalline ethylene copolymer.

When the content of the ethylene is less than about 70% by weight based on the weight of the copolymer, the polymerization ratio of the non-crystalline ethylene-propylene copolymer is increased, thereby increasing the impact strength of the propylene block copolymer resin. However, the crystallinity and surface hardness thereof are decreased, thus reducing the scratch resistance and low glossiness of the polyolefin-based resin composition. On the other hand, when the content of the ethylene is more than about 90% by weight based on the weight of the copolymer, the ratio of the semi-crystalline ethylene copolymer is increased, thus improving the scratch resistance and low glossiness of the polypropylene block copolymer resin. However, the compatibility of the ethylene-propylene copolymer with the homopolypropylene is reduced, thereby reducing the impact strength of the polypropylene block copolymer resin.

Further, the polypropylene block copolymer resin preferably has a melt index of about 8 to 150 g/10 min (230° C., 2.16 Kgf). When the melt index of the polypropylene resin is less than about 8 g/10 min (230° C., 2.16 Kgf), there is a problem in that the molding processability of the polypropylene block copolymer resin deteriorates. On the other hand, when the melt index is more than about 150 g/10 min (230° C., 2.16 Kgf), there is a problem in that the impact strength of the polypropylene block copolymer resin is reduced.

2) Thermoplastic Elastomer Rubber

The thermoplastic elastomer rubber is a component that improves the impact resistance of the composition. Preferably, the thermoplastic elastomer rubber is present in an amount of about 1 to 40% by weight based on the total weight of the composition. When the content of the thermoplastic elastomer rubber is less than about 1% by weight based on the total weight of the composition, the impact resistance of the composition is severely reduced. On the other hand, when the content is more than about 40% by weight, the scratch resistance of the composition is sharply reduced.

With respect to the thermoplastic elastomer rubber, any conventional thermoplastic elastomer rubbers can suitably be used. According to preferred embodiments, the thermoplastic elastomer rubber is a copolymer of ethylene and a $C_2$ to $C_{10}$ α-olefin. The α-olefin is not particularly limited, and any conventional α-olefins can suitably be used. According to preferred embodiments, the α-olefin includes one or more selected from the group consisting of propylene, butene, pentene, hexene, propene, octene, and the like.

Preferably, the thermoplastic elastomer rubber includes one or more selected from the group consisting of ethylene-propylene rubber (EPR), ethylene-propylene-diene rubber (EPDM), ethylene-butene copolymer (EBR), ethylene-octene copolymer (EOR), and styrene-butadiene (SBR). According to exemplary embodiments, the thermoplastic elastomer rubber is ethylene-octene copolymer (EOR), and/or ethylene-butene copolymer (EBR).

Specifically, when the ethylene-octene copolymer (EOR) is added to the polyolefin-based resin composition, the impact strength of the polyolefin-based resin composition is improved by an octene group present at a long branched chain of the ethylene-octene copolymer (EOR). As such, the composition is effective in reinforcing the impact resistance of the composition, which is relatively reduced.

Further, it is preferred that the ethylene-butene copolymer (EBR) includes about 50% by weight or more of a butene comonomer based on the weight of the EBR. More preferably, the EBR has a melt index of about 0.5 to 150 g/10 min (190° C., 2.6 kgf) and a density of about 0.868 to 0.885 g/cc.

3) Inorganic Filler

The inorganic filler is a component that reinforces the heat resistance and rigidity of the composition. Preferably, the inorganic filler is present in an amount of about 1 to 30% by weight based on the total weight of the composition. When the content of the inorganic filler is less than about 1% by weight based on the total weight of the composition, it is difficult to sufficiently improve the rigidity and hardness of the composition. On the other hand, when the content is more than about 30% by weight, the moldability deteriorates due to an excessive increase in rigidity and hardness.

The constitution of the inorganic filler is not particularly limited, and any conventional inorganic fillers can suitably be used. According to preferred embodiments, the inorganic filler includes one or more selected from the group consisting of talc, calcium carbonate, calcium sulfate, magnesium oxide, calcium stearate, wollastonite, mica, silica, calcium silicate, clay, carbon black, and the like. According to an exemplary embodiment, the inorganic filler includes is one or more of talc and/or wollastonite.

Preferably, the inorganic filler has an average particle diameter of about 1 to 30 μm, and more preferably about 5 to 10 μm. When the average particle diameter of the inorganic filler is less than about 1 μm, an effect of reinforcing the heat resistance and rigidity of the polyolefin-based resin composition may not be sufficiently exhibited. On the other hand, when the average particle diameter of the inorganic filler is more than about 30 μm, it may become more difficult to treat and work with the polyolefin resin composition during the extrusion molding thereof.

4) Fluoroacrylamide-Based Copolymer

The fluoroacrylamide-based copolymer is a component that maximizes the scratch resistance of the composition. Preferably, the fluoroacrylamide-based copolymer is present in an amount of about 1 to 5% by weight based on the total weight of the composition. When the content of the fluoroacrylamide-based copolymer is less than about 1% by weight, the scratch resistance effect may be insufficient. On the other hand, when the content is more than about 5% by weight, the rigidity of the composition is excessively increased, and thus moldability may deteriorate. Further, it is preferred that the fluoroacrylamide-based copolymer has a number average molecular weight of about 50,000 to 100,000 g/mol.

Specifically, the fluoroacrylamide-based copolymer along with a high crystalline polypropylene and a non-linear polypropylene may maximize the scratch resistance of the polyolefin-based resin composition. Further, and the high crystalline polypropylene and the non-linear polypropylene may reinforce the structure of the polyolefin-based resin composition. As such, the scratch resistance and mechanical properties of the composition are improved.

Preferably, the fluoroacrylamide-based copolymer includes a fluorine component, an acrylic component, a fatty acid amide component, and the like, wherein the fluorine and acrylic components are copolymerized. The fatty acid amide and fluorine components may impart an excellent surface slip property to the polyolefin-based resin composition. The acrylic component may impart excellent surface scratch resistance to the polyolefin-based resin composition and may further minimize scratch causing factors to be transferred to the surface of the composition, thereby improving the scratch resistance of the polyolefin-based resin composition.

According to aspects of the present invention, a method of preparing a polyolefin-based resin composition is provided which includes: mixing a polypropylene block copolymer resin including a homopolypropylene and an ethylene-propylene copolymer, a thermoplastic elastomer rubber, an inorganic filler, and a fluoroacrylamide-based copolymer for about 3 minutes, extruding the mixture in a temperature range from about 190° C. to 250° C. with an extruder, and then cooling and solidifying the mixture to preparing a pellet composition; and injecting the pellet composition in a temperature range from about 180 to 200° C.

The polyolefin-based resin composition according to the present invention is not limited in its potential applications thereof. However, it is preferred that the composition is provided for use in automobile interior and exterior materials. Specifically, it is preferred that the composition is utilized as a material for a door trim, an instrument panel, a console and the like of an automobile interior material. The composition may also be suitably used for an uncoated bumper of an automobile exterior material (MIC automobile bumper (MIC car bumper fascia) and the like.

EXAMPLE 1

Hereinafter, the present invention will be described in more detail through the Examples. These Examples are only for illustrating the present invention, and it will be obvious to those skilled in the art that the scope of the present invention is not interpreted to be limited by these Examples.

In order to investigate the scratch resistance, low glossiness, and physical properties of the present invention, Examples and Comparative Examples were prepared with the constitution as shown in the following Tables 1 to 3.

TABLE 1

| Classification | BPP-1 | BPP-2 | BPP-3 | BPP-4 |
| --- | --- | --- | --- | --- |
| Homopolypropylene (% by weight) | 92 | 94 | 92 | 94 |
| EPR (% by weight) | 8 | 6 | 8 | 6 |
| Ethylene in EPR (% by weight) | 80 | 75 | 45 | 40 |
| Isotactic pentad fraction | 97 | 97 | 94 | 94 |
| MI (g/10 min) | 35 | 50 | 35 | 50 |

MI: Melt Index
EPR: Ethylene-propylene copolymer
BPP: Polypropylene block copolymer resin Table 1 is a table showing the homopolypropylene content, the EPR content, the ethylene content in the EPR, the isotactic pentad fraction, and the melt index of the polypropylene block copolymer resins.

In Table 1, the BPP-1 is a polypropylene block copolymer resin which is applied to the Example 1 in the following Table 2, the BPP-2 is a polypropylene block copolymer resin which is applied to Example 2 in the following Table 2, the BPP-3 is a polypropylene block copolymer resin which is applied to Comparative Examples 1 and 3 in the following Table 3, and the BPP-4 is a polypropylene block copolymer resin which is applied to Comparative Example 2 in the following Table 3.

TABLE 2

| Classification | BPP-1 (% by weight) | BPP-2 (% by weight) | Thermoplastic elastomer rubber (% by weight) | Inorganic filler (% by weight) | Fluoroacrylamide-based copolymer (% by weight) |
| --- | --- | --- | --- | --- | --- |
| Example 1 | 78 | — | 10 | 10 | 2 |
| Example 2 | — | 78 | 10 | 10 | 2 |

Thermoplastic elastomer rubber: DF-605 (50% by weight or more of butene based on the total weight of the thermoplastic elastomer rubber, Mitsui Chemicals)
Inorganic filler: KCM6300 (Talc, KOCH)
Fluoroacrylamide-based copolymer: FS-830 (CN Tech.)

Table 2 is a table showing the contents of the polypropylene block copolymer resins, the thermoplastic elastomer rubbers, the inorganic fillers, and the fluoroacrylamide-based copolymers of the scratch resistance and low glossiness polyolefin-based resin compositions in Examples 1 and 2. Such resin compositions are in accordance with the present invention.

TABLE 3

| Classification | BPP-3 (% by weight) | BPP-4 (% by weight) | Thermoplastic elastomer (% by weight) | Inorganic filler (% by weight) | Fluoroacrylamide-based copolymer (% by weight) |
| --- | --- | --- | --- | --- | --- |
| Comparative Example 1 | 78 | — | 10 | 10 | 2 |
| Comparative Example 2 | — | 78 | 10 | 10 | 2 |
| Comparative Example 3 | 73 | — | 10 | 10 | 7 |

Thermoplastic elastomer: DF-605 (50% by weight or more of butene, Mitsui Chemicals)
Inorganic filler: KCM6300 (Talc, KOCH)
Fluoroacrylamide-based copolymer: FS-830 (CN Tech.)

Table 3 is a table showing the contents of the polypropylene block copolymer resins, the thermoplastic elastomer rubbers, the inorganic fillers, and the fluoroacrylamide-based copolymers of the scratch resistance and low glossiness polyolefin-based resin composition in Comparative Examples 1 to 3. Such compositions are conventional compositions.

Furthermore, referring to the constituent components in Tables 1 to 3, pellet compositions according to the Examples and Comparative Examples were prepared by mixing a polypropylene block copolymer resin including a homopolypropylene and an ethylene-propylene copolymer, a thermoplastic elastomer rubber, an inorganic filler, and a fluoroacrylamide-based copolymer by a Henschel mixer for about 3 minutes, extruding the mixture in a temperature range from 190 to 250° C. by a twin extruder, and then cooling and solidifying the mixture. Moreover, a final composition was prepared by injecting the pellet composition in a temperature range from 180 to 250° C. according to the melt index thereof. The final composition prepared at this time was subjected to scratch resistance, low glossiness, and physical property tests in the following Table 5.

TABLE 4

| Magnitude | Scratch width (μm) | Appearance |
|---|---|---|
| | Criteria for determination | |
| Magnitude 5 | <20 | Almost no surface damage |
| Magnitude 4 | 100 to 200 | Obvious surface damage is not recognizable |
| Magnitude 3 | 200 to 300 | Recognized that there is minute surface damage |
| Magnitude 2 | 300 to 400 | Whitening is caused by obvious surface damage |
| Magnitude 1 | >400 | Very severe surface damage |

It is determined that magnitude 3 or more in the automobile criteria is suitable for the application to the automobile interior materials.

Table 4 is a table showing the criteria for determination of scratch resistance. The magnitudes for the scratch resistance of a composition are classified according to the width of the scratch as a reference, which is generated when force is applied to the surface of an object under the same conditions, meaning that the scratch resistance of the composition is improved as the magnitude increases from level 1 to level 5.

TABLE 5

| Classification | Melt index (g/10 min) | Flexural modulus (kg/cm²) | Izod impact strength (kgcm/cm²), −10° C. | Degree of gloss (60°) | Scratch resistance |
|---|---|---|---|---|---|
| Example 1 | 17 | 22,000 | 5 | 20 | Magnitude 3.5* |
| Example 2 | 25 | 18,400 | 5.5 | 23 | Magnitude 3.0 |
| Comparative Example 1 | 16 | 21,800 | 3.5 | 76 | Magnitude 2.0 |
| Comparative Example 2 | 23 | 16,900 | 4.1 | 70 | Magnitude 2.0 |
| Comparative Example 3 | 17 | 12,000 | 6.5 | 50 | Magnitude 3.0 |

*Magnitude 3.5: Magnitude 3 in scratch width, but better than magnitude 3 in appearance surface state Table 5 is a table comparing scratch resistance, low glossiness, and physical properties in the Examples and Comparative Examples prepared and described in Tables 1 to 3.

The melt index was measured in accordance with the ASTM D-1238 method, and the test conditions were 230° C. and 2.16 kgf. The melt index shows the weight of the composition that flows in a capillary tube under a predetermined condition for 10 minutes, where the smaller the value is, the larger the molecular weight of the composition is, and the larger the molecular weight thereof is, the more improved the physical properties (such as rigidity, chemical resistance, elongation and the like) are.

The flexural modulus was measured in accordance with the ASTM D-790 method, the specimen size was 12.7×127×6.4 mm, and the speed of the crosshead under the test condition was 28 mm/min. The flexural modulus indicates a ratio of stress to strain within the elastic limit when a flexural load is applied to the composition, meaning that the larger the value is, the higher the flexural load is borne, and thus physical properties of the composition are improved.

The Izod impact strength was measured in accordance with the ASTM D-256 method, and the specimen size was 63.5× 127×3 mm. The Izod impact strength indicates the intensity of resistance appearing when an object is impacted, meaning that the larger the value is, the larger the impact is borne, and thus physical properties are improved.

The degree of gloss (60°) was measured by using a Micro-TR1-gloss (BYD). The degree of gloss represents the gloss quantitatively, meaning that the smaller the value is, the smaller the gloss is, and thus low glossiness is improved.

The criteria for determination of scratch resistance (Load: 5 N, Stroke: 100 mm, and Speed: 100 mm/s) were applied as in the method in Table 4.

As can be observed in Table 5, Example 1, in which the contents of the polypropylene block copolymer resin, the fluoroacrylamide-based copolymer and the like were optimized according to the present invention, had excellent scratch resistance due to the high level in scratch resistance and excellent low glossiness due to the low degree of gloss. Further, other physical properties were also above the average values.

Example 2 demonstrated relatively excellent Izod impact strength, degree of gloss, and scratch resistance, but was disadvantageous in that the melt index and the flexural modulus were low.

Comparative Example 1 was disadvantageous in that characteristics other than the melt index were low.

Comparative Example 2 was disadvantageous in that all the characteristics were low.

When the fluoroacrylamide-based copolymer was added in an excessive amount as in Comparative Example 3, the melt index, the Izod impact strength and the scratch resistance were excellent, but there was a disadvantage in that the flexural modulus was low, the degree of gloss was high (i.e. low glossiness was not achieved).

Figure 2:
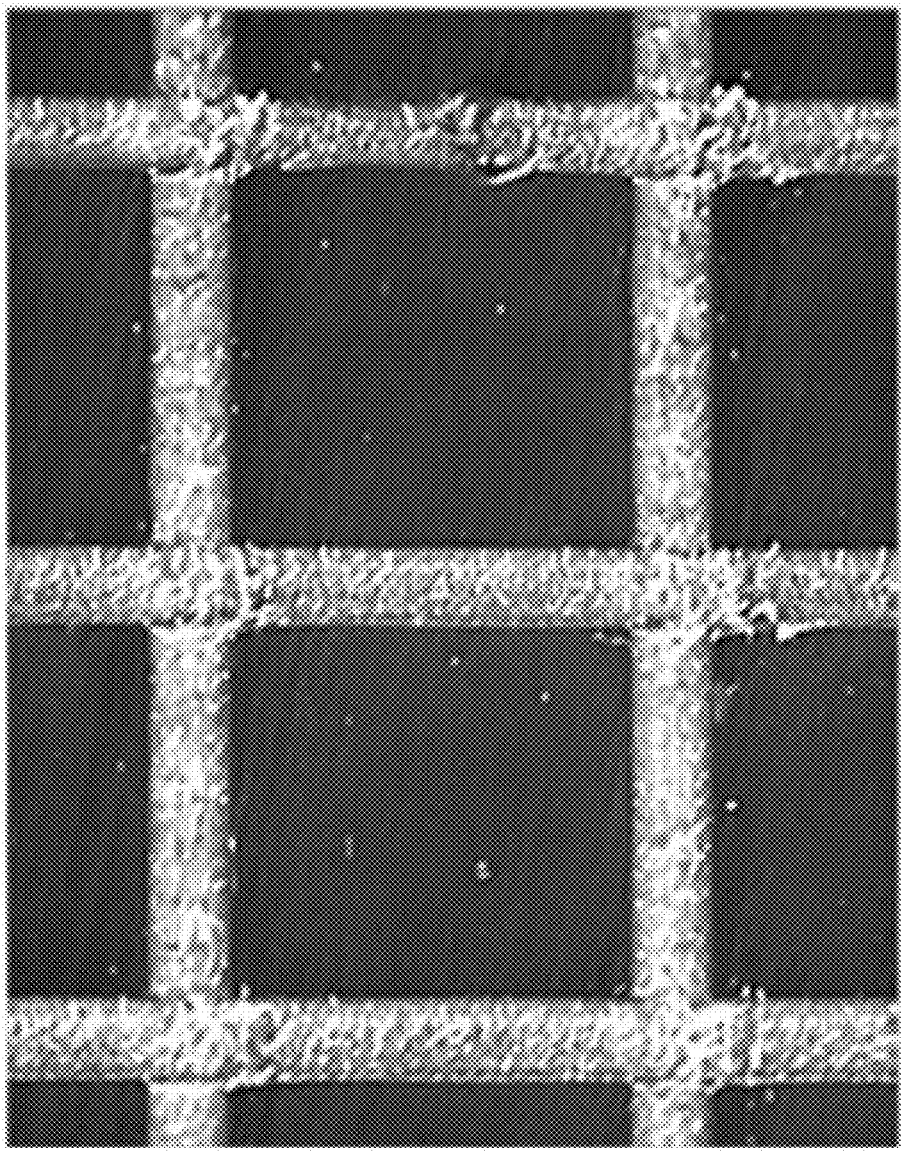
FIG. 2 is a photograph of a scratch resistance test result of Comparative Example 1.

FIG. 1 is a photograph of a scratch resistance test result of Example 1, and FIG. 2 is a photograph of a scratch resistance test result of Comparative Example 1. As demonstrated, scratches were produced in less amounts in Example 1 in FIG. 1 than in Comparative Example 1 in FIG. 2. As such, scratch resistance in Example 1 was excellent.

Figure 3:
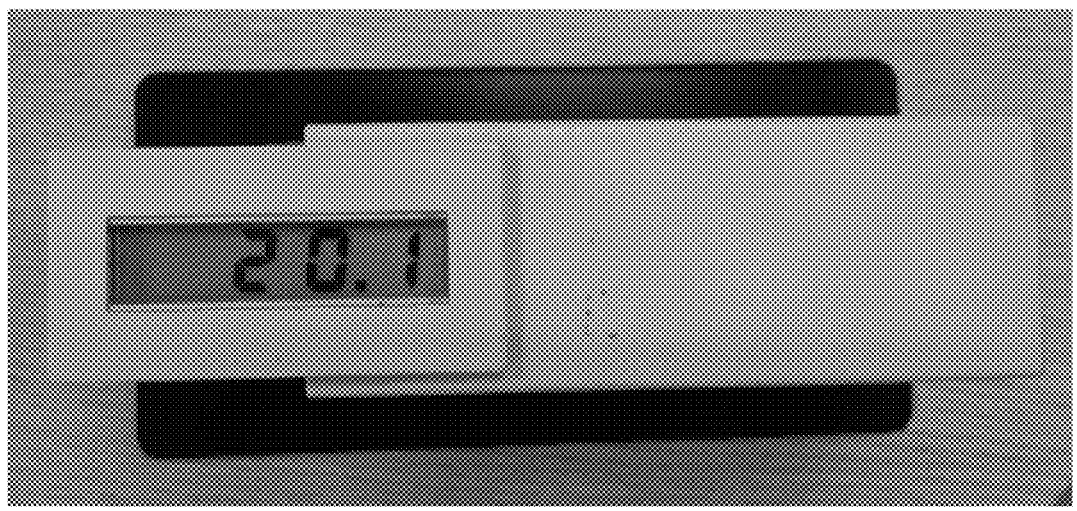
FIG. 3 is a photograph of a degree of gloss (60°) measurement result of Example 1.
Figure 4:
FIG. 4 is a photograph of a degree of gloss (60°) measurement result of Comparative Example 1.

FIG. 3 is a photograph of a degree of gloss (60°) measurement result of Example 1, and FIG. 4 is a photograph of a degree of gloss (60°) measurement result of Comparative Example 1. The Example in FIG. 3 had a degree of gloss of 20.1, and the degree of gloss was reduced by about 74% compared to the Comparative Example 4 in FIG. 4 (which had a degree of gloss of 76.4).

Accordingly, it was possible to prepare a polyolefin-based resin composition having excellent scratch resistance and low glossiness while maintaining physical properties by Example 1, in accordance with the present invention.

As described above, the present invention has been described in relation to specific embodiments of the present invention, but this is only for illustration and the present invention is not limited thereto. Embodiments described may be changed or modified by those skilled in the art to which the present invention pertains without departing from the scope of the present invention, and various alterations and modifications are possible within the technical spirit of the present invention and the equivalent scope of the claims which will be described below.

What is claimed is:

1. A polyolefin-based resin composition comprising about 56 to 97% by weight of a polypropylene block copolymer resin, about 1 to 9% by weight of a thermoplastic elastomer rubber, about 1 to 30% by weight of an inorganic filler, and about 1 to 5% by weight of a fluoroacrylamide-based copolymer, based on a total weight of the composition, wherein the fluoroacrylamide-based copolymer has a number average molecular weight of about 50,000 to 100,000 g/mol.

2. The polyolefin-based resin composition of claim 1, wherein the polypropylene block copolymer resin comprises:

about 80 to 95% by weight of a homopolypropylene based on total weight of the polypropylene block copolymer resin, the homopolypropylene having an isotactic pentad fraction of about 99% or more; and about 5 to 20% by weight of an ethylene-propylene copolymer based on total weight of the polypropylene block copolymer resin, the ethylene-propylene copolymer comprising ethylene in an amount of about 70 to 90% by weight based on total weight of the ethylene-propylene copolymer.

3. The polyolefin-based resin composition of claim 1, wherein the polypropylene block copolymer resin has a melt index of about 8 to 150 g/10 min, measured at about 230° C. and about 2.16 Kgf.

4. The polyolefin-based resin composition of claim 1, wherein the thermoplastic elastomer rubber is a copolymer of ethylene and $C_2$ to $C_{10}$ α-olefin.

5. The polyolefin-based resin composition of claim 4, wherein the α-olefin comprises one or more selected from the group consisting of propylene, butene, pentene, hexene, propene, and octene.

6. The polyolefin-based resin composition of claim 1, wherein the thermoplastic elastomer rubber comprises one or more selected from the group consisting of ethylene-propylene rubber (EPR), ethylene-propylene-diene rubber (EPDM), ethylene-butene copolymer (EBR), ethylene-octene copolymer (EOR), and styrene-butadiene (SBR).

7. The polyolefin-based resin composition of claim 6, wherein the ethylene-butene copolymer (EBR) comprises about 50% by weight or more of a butene comonomer based on a weight of the EBR, and has a melt index of about 0.5 to 150 g/10 min, measured at about 190° C. and about 2.6 kgf, and a density of about 0.868 to 0.885 g/cc.

8. The polyolefin-based resin composition of claim 1, wherein the inorganic filler comprises one or more selected from the group consisting of talc, calcium carbonate, calcium sulfate, magnesium oxide, calcium stearate, wollastonite, mica, silica, calcium silicate, clay, and carbon black.

9. The polyolefin-based resin composition of claim 1, wherein the inorganic filler has an average particle diameter of about 1 to 30 μm.

10. An automobile interior and exterior material prepared by using the polyolefin-based resin composition of claim 1.

* * * * *